(12) United States Patent
Mielczarek et al.

(10) Patent No.: US 12,341,579 B2
(45) Date of Patent: *Jun. 24, 2025

(54) MITIGATION OF TRANSMISSION ERRORS OF QUANTIZED CHANNEL STATE INFORMATION FEEDBACK IN MULTI ANTENNA SYSTEMS

(71) Applicant: Wi-LAN Inc., Ottawa (CA)

(72) Inventors: Bartosz Mielczarek, Edmonton (CA); Witold A. Krzymien, Edmonton (CA)

(73) Assignee: Wi-LAN Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,862

(22) Filed: Feb. 12, 2024

(65) Prior Publication Data

US 2024/0187044 A1 Jun. 6, 2024

Related U.S. Application Data

(63) Continuation of application No. 18/097,676, filed on Jan. 17, 2023, now Pat. No. 11,901,976, which is a
(Continued)

(51) Int. Cl.
*G06F 11/00* (2006.01)
*H04B 7/0413* (2017.01)
(Continued)

(52) U.S. Cl.
CPC ......... *H04B 7/0417* (2013.01); *H04B 7/0413* (2013.01); *H04B 7/0456* (2013.01);
(Continued)

(58) Field of Classification Search
CPC ... H04B 7/0417; H04B 7/0413; H04B 7/0456
See application file for complete search history.

(56) References Cited

U.S. PATENT DOCUMENTS

| 5,706,312 A | 1/1998 | Wei |
| 5,790,676 A | 8/1998 | Ganesan et al. |

(Continued)

FOREIGN PATENT DOCUMENTS

| CA | 2 548 919 | 6/2005 |
| CN | 101136718 A | 3/2008 |

(Continued)

OTHER PUBLICATIONS

Balachandran et al., "Channel Quality Estimation and Rate Adaptation for Cellular Mobile Radio," IEEE Journal on Selected Areas in Communication 17(7):1244-1256 (Jul. 1999).

(Continued)

*Primary Examiner* — Philip Guyton
(74) *Attorney, Agent, or Firm* — Volpe Koenig

(57) ABSTRACT

Methods are disclosed for improving communications on feedback transmission channels, in which there is a possibility of bit errors. The basic solutions to counter those errors are: proper design of the CSI vector quantizer indexing (i.e., the bit representation of centroid indices) in order to minimize impact of index errors, use of error detection techniques to expurgate the erroneous indices and use of other methods to recover correct indices.

20 Claims, 8 Drawing Sheets

Related U.S. Application Data continuation of application No. 16/538,218, filed on Aug. 12, 2019, now Pat. No. 11,558,087, which is a continuation of application No. 15/144,743, filed on May 2, 2016, now Pat. No. 10,382,103, which is a continuation of application No. 14/270,074, filed on May 5, 2014, now Pat. No. 9,331,768, which is a continuation of application No. 13/541,631, filed on Jul. 3, 2012, now Pat. No. 8,719,673, which is a continuation of application No. 12/107,047, filed on Apr. 21, 2008, now Pat. No. 8,234,546.

(51) Int. Cl.
  H04B 7/0417  (2017.01)
  H04B 7/0456  (2017.01)
  H04B 7/06    (2006.01)
  H04L 1/00    (2006.01)
  H04L 25/02   (2006.01)
  H04L 25/03   (2006.01)

(52) U.S. Cl.
  CPC .......... *H04B 7/0619* (2013.01); *H04B 7/063* (2013.01); *H04B 7/0652* (2013.01); *H04B 7/0656* (2013.01); *H04L 1/0026* (2013.01); *H04L 1/0029* (2013.01); *H04L 1/0042* (2013.01); *H04L 25/0248* (2013.01); *H04L 25/0204* (2013.01); *H04L 25/03203* (2013.01); *H04L 2025/03426* (2013.01); *H04L 2025/03802* (2013.01)

(56) References Cited

U.S. PATENT DOCUMENTS

| | | | |
|---|---|---|---|
| 6,952,671 B1 | 10/2005 | Kolesnik et al. | |
| 7,333,556 B2 | 2/2008 | Maltsev et al. | |
| 7,489,664 B2 | 2/2009 | Kim et al. | |
| 7,570,627 B2 | 8/2009 | Welborn et al. | |
| 7,587,172 B2 | 9/2009 | Kim et al. | |
| 7,599,714 B2 | 10/2009 | Kuzminskiy | |
| 7,613,244 B2 | 11/2009 | Hwang et al. | |
| 7,676,007 B1 | 3/2010 | Choi et al. | |
| 7,702,029 B2 | 4/2010 | Kotecha et al. | |
| 8,750,358 B2 | 6/2014 | Yue et al. | |
| 11,558,087 B2 * | 1/2023 | Mielczarek | H04L 1/0029 |
| 11,901,976 B2 * | 2/2024 | Mielczarek | H04B 7/063 |
| 2003/0012290 A1 | 1/2003 | Fimoff et al. | |
| 2003/0017835 A1 | 1/2003 | Bergel | |
| 2003/0144032 A1 | 7/2003 | Brunner et al. | |
| 2004/0057394 A1 | 3/2004 | Holtzman | |
| 2004/0190636 A1 | 9/2004 | Oprea | |
| 2004/0259555 A1 | 12/2004 | Rappaport et al. | |
| 2005/0047517 A1 | 3/2005 | Georgios et al. | |
| 2005/0195912 A1 | 9/2005 | Kim et al. | |
| 2005/0259764 A1 | 11/2005 | Hung Lai et al. | |
| 2005/0286618 A1 | 12/2005 | Abe | |
| 2005/0286663 A1 | 12/2005 | Poon | |
| 2006/0008021 A1 | 1/2006 | Bonnet | |
| 2006/0019602 A1 | 1/2006 | Ionescu | |
| 2006/0034165 A1 | 2/2006 | Levy | |
| 2006/0039489 A1 | 2/2006 | Ikram | |
| 2006/0056531 A1 | 3/2006 | Li | |
| 2006/0111148 A1 | 5/2006 | Mukkavilli | |
| 2006/0155534 A1 | 7/2006 | Lin | |
| 2006/0165008 A1 | 7/2006 | Li et al. | |
| 2006/0215780 A1 | 9/2006 | Yeon et al. | |
| 2006/0233265 A1 | 10/2006 | Rajan et al. | |
| 2006/0268623 A1 | 11/2006 | Chae | |
| 2007/0064780 A1 | 3/2007 | Zheng et al. | |
| 2007/0104283 A1 | 5/2007 | Han et al. | |
| 2007/0120670 A1 | 5/2007 | Torchalski | |
| 2007/0153731 A1 | 7/2007 | Fine | |
| 2007/0160011 A1 | 7/2007 | Kim et al. | |
| 2007/0191066 A1 | 8/2007 | Khojastepour et al. | |
| 2007/0211813 A1 | 9/2007 | Talwar et al. | |
| 2007/0211823 A1 | 9/2007 | Mazzarese et al. | |
| 2007/0254602 A1 | 11/2007 | Li et al. | |
| 2007/0263746 A1 | 11/2007 | Son | |
| 2008/0037669 A1 | 2/2008 | Pan et al. | |
| 2008/0080449 A1 | 4/2008 | Huang | |
| 2008/0080459 A1 | 4/2008 | Kotecha | |
| 2008/0084943 A1 | 4/2008 | Jung et al. | |
| 2008/0086669 A1 | 4/2008 | Cheng et al. | |
| 2008/0101321 A1 | 5/2008 | Cheng et al. | |
| 2008/0165875 A1 | 7/2008 | Mundarath et al. | |
| 2008/0165876 A1 | 7/2008 | Suh et al. | |
| 2008/0192717 A1 | 8/2008 | Kent et al. | |
| 2008/0219369 A1 | 9/2008 | Wu et al. | |
| 2008/0232274 A1 | 9/2008 | Grover | |
| 2008/0253471 A1 | 10/2008 | Sadowsky et al. | |
| 2008/0268862 A1 | 10/2008 | Kent | |
| 2008/0285670 A1 | 11/2008 | Walton | |
| 2009/0006925 A1 | 1/2009 | Pan | |
| 2009/0046594 A1 | 2/2009 | Zhou et al. | |
| 2009/0067512 A1 | 3/2009 | Mielczarek | |
| 2009/0067529 A1 | 3/2009 | Mielczarek et al. | |
| 2009/0075686 A1 | 3/2009 | Gomamdam et al. | |
| 2009/0201861 A1 | 8/2009 | Kotecha | |
| 2009/0265601 A1 | 10/2009 | Mielczarek | |
| 2009/0274230 A1 | 11/2009 | Heath et al. | |
| 2009/0323773 A1 | 12/2009 | Bala et al. | |
| 2010/0046666 A1 | 2/2010 | Ketchum | |
| 2010/0150036 A1 | 6/2010 | Zheng | |
| 2010/0232525 A1 | 9/2010 | Xia et al. | |
| 2010/0266054 A1 | 10/2010 | Mielczarek | |
| 2010/0322336 A1 | 12/2010 | Nabar | |
| 2012/0057643 A1 | 3/2012 | Lin | |
| 2012/0120823 A1 | 5/2012 | Kotecha | |
| 2014/0064415 A1 | 3/2014 | Hultell et al. | |
| 2014/0126663 A1 | 5/2014 | Cheng et al. | |

FOREIGN PATENT DOCUMENTS

| | | |
|---|---|---|
| WO | 2005/057812 | 6/2005 |
| WO | 2005/081439 | 9/2005 |
| WO | 2005/125044 | 12/2005 |
| WO | 2007/007249 | 1/2007 |
| WO | 2007/066936 | 6/2007 |
| WO | 2007/094832 | 8/2007 |

OTHER PUBLICATIONS

Bulumulla et al., "A Systemic Approach to Detecting OFDM Signals in a Fading Channel," IEEE Transactions on Communications 48(5):725-728 (May 2000).

Caire et al., "Multiuser MIMO Achievable Rates with Downlink Training and Channel State Feedback," IEEE Transactions on Information Theory 56(6):2845-2866 (Jun. 2010).

IEEE Standard for Local and metropolitan area networks; Part 16: Air Interface for Fixed Broadband Wireless Access Systems, IEEE Std 802.16-2004 (Oct. 1, 2004).

IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Std 802.16e-2005 and IEEE Std 802.16-2004/Cor1-2005 (Feb. 28, 2006).

Jindal, "MIMO Broadcast Channels with Digital Channel Feedback," 40$^{th}$ Asilomar Conference on Signals, Systems and Computers (ACSSC '06), Pacific Grove, Calif., pp. 1506-1510 (Oct. 29-Nov. 1, 2006).

Larsson et al., "Off-line dictionary-based compression," Proceedings of the IEEE, vol. 88, Issue 11, pp. 1722-1732 (Nov. 2000).

Li et al., "Test Data Compression Using Dictionaries with Fixed-Length Indices," Proceedings of the VLSI Test Symposium (Apr. 27-May 1, 2003).

Mielczarek et al., "Flexible Channel Feedback Quantization in Multiple Antenna Systems," IEEE 61$^{st}$ Vehicular Technology Conference, Stockholm, vol. 1, pp. 620-624 (May 30-Jun. 1, 2005).

(56) References Cited

OTHER PUBLICATIONS

Mielczarek et al., "Influence of CSI Feedback Delay on Capacity of Linear Multi-User MIMO Systems," IEEE Wireless Communications and Networking Conference, Hong Kong, pp. 1189-1192 (Mar. 11-15, 2007).

Mielczarek et al., "Influence of SCI Feedback Errors on Capacity of Linear Multi-User MIMO Systems," IEEE 65th Vehicular Technology Conference, Dublin, Ireland, pp. 2043-2047 (Apr. 22-25, 2007).

Mielczarek et al., "Quantized CSI Prediction in Linear Multi-User MIMO Systems," IEEE 67th Vehicular Technology Conference, Singapore, pp. 852-857 (May 11-14, 2008).

Mielczarek et al., "Vector Quantization of Channel Information in Linear Multi-User MIMO Systems," IEEE Ninth International Symposium on Spread Spectrum Techniques and Applications, Manaus, Brazil, pp. 302-306 (Aug. 28-31, 2006).

Raghavan et al., "Systemic Codebook Designs for Quantized Beamforming in Correlated MIMO Channels," IEEE Journal on Selected Areas in Communication 25(7):1298-1310 (Sep. 2007).

Ravindran et al., "MIMO Broadcast Channels with Block Diagonalization and Finite Rate Feedback," IEEE International Conference on Acoustics, Speech and Signal Processing, Honolulu, pp. III-13-III-16 (Apr. 2007).

Ravindran et al., "MIMO Broadcast Channels with Block Diagonalization and Finite Rate Feedback," Computing Research Repository—CORR, arXiv:cs/0610077v1, 4 pages (Oct. 2006).

Roh et al., "Channel Feedback Quantization Methods for MISO and MIMO Systems," 15th IEEE International Symposium on Personal, Indoor, and Mobile Radio Communications, Barcelona, Spain, vol. 2, pp. 805-809 (Sep. 5-8, 2004).

Sadrabadi et al., "A New Method of Channel Feedback Quantization for High Data Rate MIMO Systems," Technical Report UW-E &CE#May 2004, Coding & Signal Transmission Laboratory, Dept. of Electrical & Computer Engineering, University of Waterloo, Waterloo, Canada, 23 pages (Mar. 20, 2004).

Sadrabadi et al., "A New Method of Channel Feedback Quantization for High Data Rate MIMO Systems," IEEE Global Telecommunications Conference, Dallas, Texas, vol. 1, pp. 91-95 (Nov. 29-Dec. 3, 2004).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.2.0 (Mar. 2008).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.2.0 (Mar. 2008).

Zorzi et al., "Lateness Probabliity of a Retransmission Scheme for Error Control on a Two-State Markov Channel," IEEE Transactions on Communications, 47(10):1537-1548 (Oct. 1999).

* cited by examiner

Fig. 1
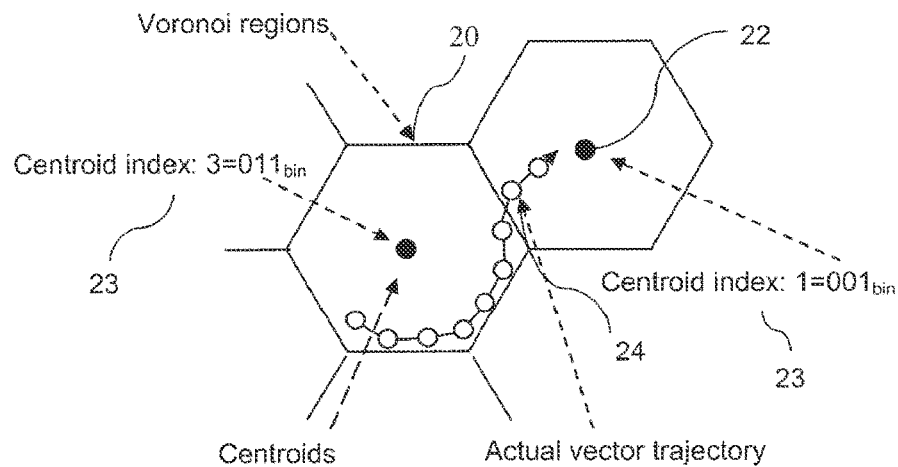
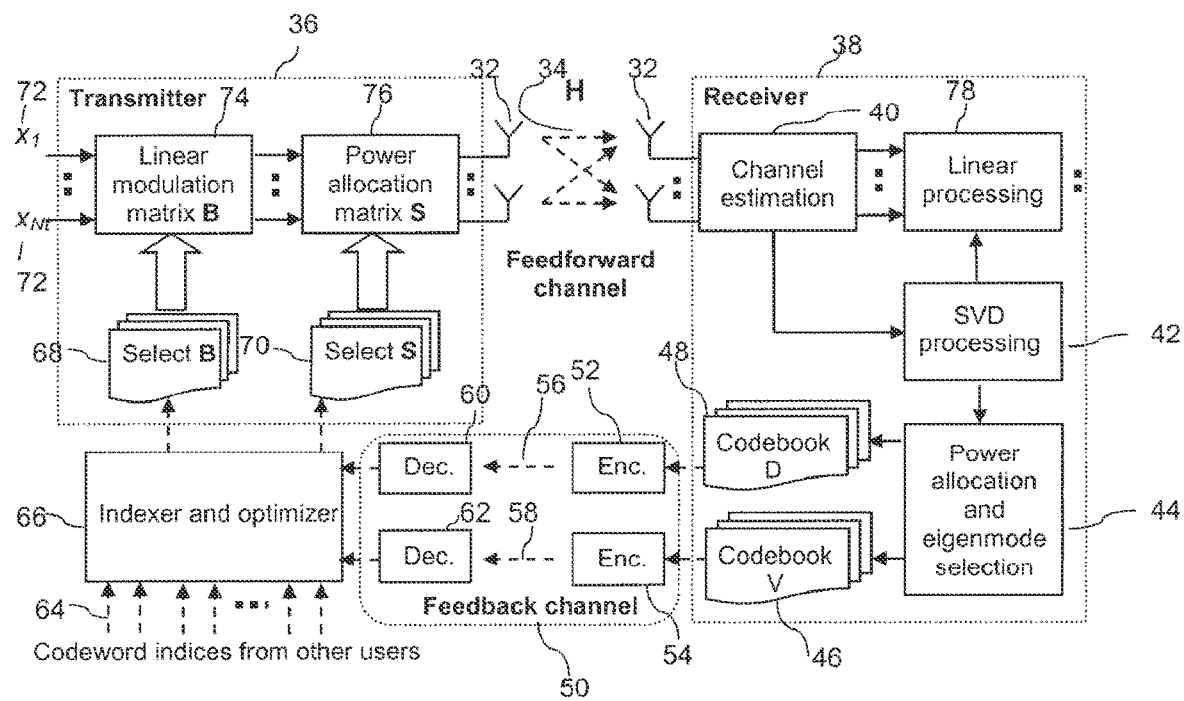
Fig. 2

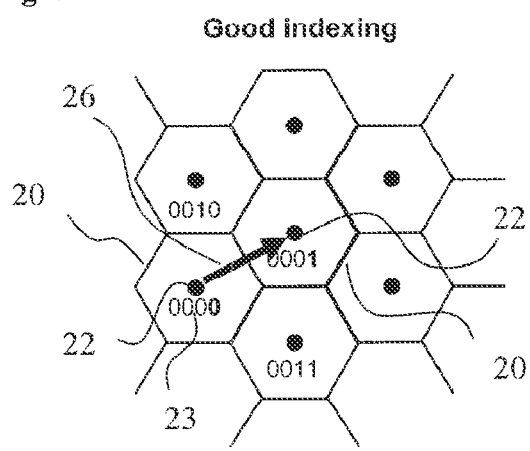
Fig. 3a Good indexing
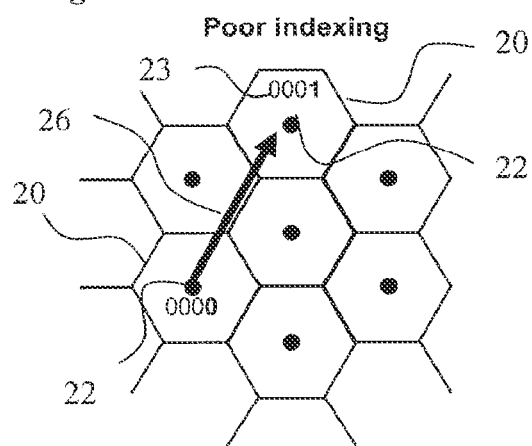
Fig. 3b Poor indexing

MITIGATION OF TRANSMISSION ERRORS OF QUANTIZED CHANNEL STATE INFORMATION FEEDBACK IN MULTI ANTENNA SYSTEMS

TECHNICAL FIELD

Wireless communication using multiple antennas.

BACKGROUND

One of the most promising solutions for increased spectral efficiency in high capacity wireless systems is the use of multiple antennas on fading channels. The fundamental issue in such systems is the availability of the channel state information (CSI) at transmitters and receivers. While it is usually assumed that perfect CSI is available at the receivers, the transmitter may only have partial CSI available due to the feedback delay and noise, channel estimation errors and limited feedback bandwidth, which forces CSI to be quantized at the receiver to minimize feedback rate.

SUMMARY

Methods are disclosed for improving communications on feedback transmission channels, in which there is a possibility of bit errors. The basic solutions to counter those errors are: proper design of the CSI vector quantizer indexing (i.e., the bit representation of centroid indices) in order to minimize impact of index errors, use of error detection techniques to expurgate the erroneous indices and use of other methods to recover correct indices (see pending US patent application "Quantized channel state information prediction in multiple antenna systems" Ser. No. 11/852,206.) The content of U.S. Ser. Nos. 11/754,965 and 11/852,206 are incorporated herein by reference.

There is provided a method of reducing the effect of errors in the feedback of channel state information from a receiver to a transmitter. In an embodiment, the method comprises the steps of choosing multiple mappings of indices to channel states, estimating the effect on transmission quality of feedback errors for each of the mappings of indices to channel states, selecting a mapping of indices to channel states to reduce the effect of feedback errors; and transmitting feedback of channel state information from the receiver to the transmitter, the receiver representing a channel state using the codeword determined by the selected mapping of indices to channel states.

These and other aspects of the method are set out in the claims, which are incorporated here by reference.

BRIEF DESCRIPTION OF THE FIGURES

Embodiments will now be described with reference to the figures, in which like reference characters denote like elements, by way of example, and in which:

FIG. 1 is a schematic diagram showing the division of the channel state space into Voronoi regions.

FIG. 2 shows the basic structure of the system proposed in U.S. patent application Ser. No. 11/754,965, and which may be used as modified according to the disclosed algorithms.

FIG. 3a shows a good mapping of indices to centroids.

FIG. 3b shows a bad mapping of indices to centroids.

DETAILED DESCRIPTION

Figure 4:
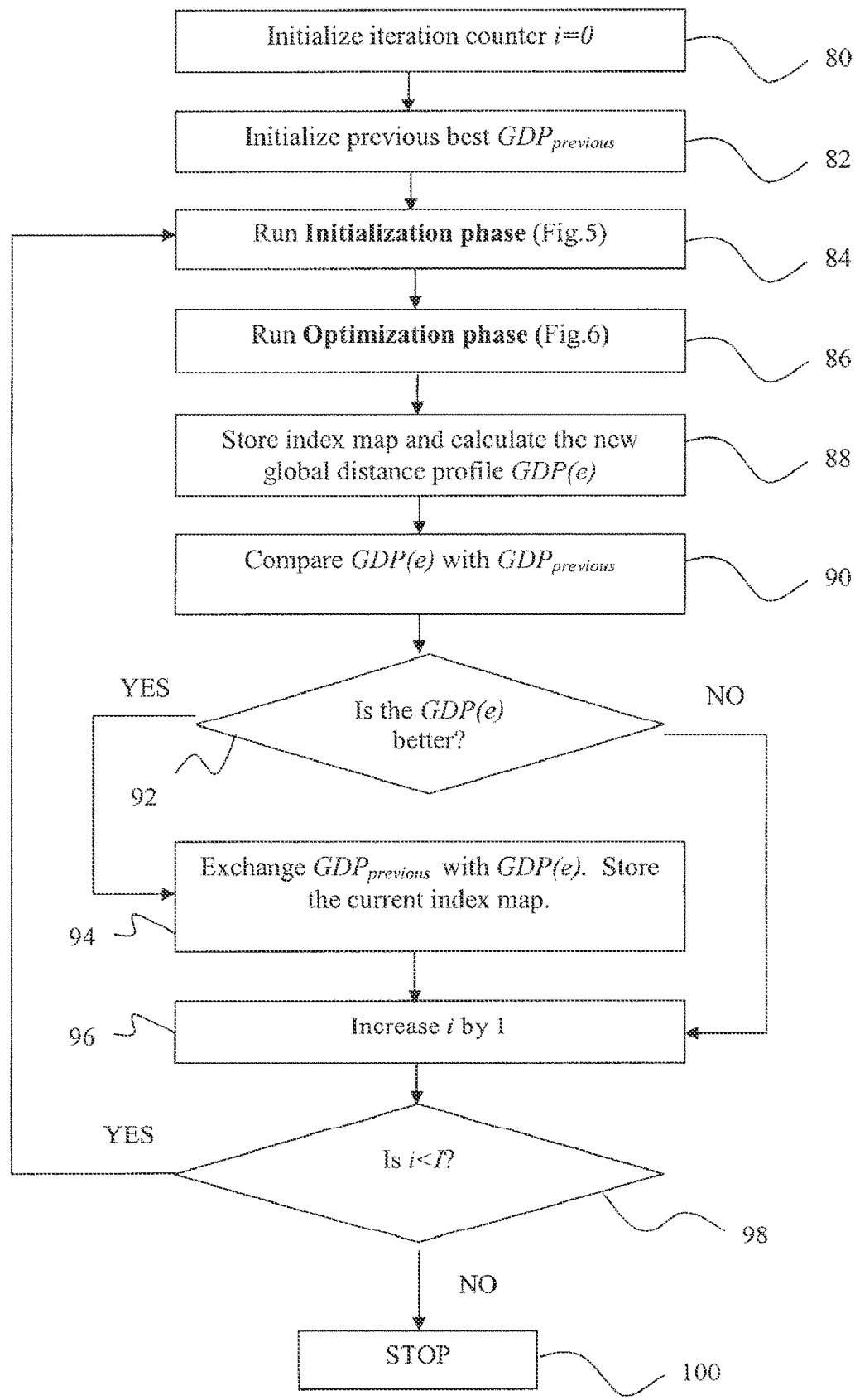
FIG. 4 shows the general operation of an embodiment of an indexing optimization algorithm.

In the typical CSI vector quantizer (VQ), the quantization of the channel vector space is performed as in FIG. 1: the available space is tessellated by Voronoi regions 20 with corresponding centroids 22 that represent all vector realizations within each Voronoi region. The number of such regions (centroids) is defined by the number of available bits and each centroid is assigned an index 23 with the binary representation of length equal to the number of available feedback bits. The indices can also be represented by arbitrary sequences of symbols, so long as each index is represented by a unique sequence of symbols, and the symbols can be transmitted by the feedback channel. When the receiver transmits its channel state information to the transmitter, it is the bits (or symbols) representing the centroid indices that are physically sent over the feedback channel. When the term "binary index" is used, one could substitute "the sequence of symbols representing the index". In the claims when a mapping of indices to channel states is mentioned, a mapping of symbol sequences to indices would serve the same purpose and so the claims should be construed to cover both.

All presented solutions can be used for both eigenmode and singular value codebooks in systems ranging from only one active receiver at a time to systems with multiple receivers being active simultaneously (where we define being active as receiving transmissions). The design of the feedback encoding solutions can be applied to quantized matrices of orthogonal eigenmodes, subsets of eigenmodes and scalar singular values as necessary. The following descriptions will be generic in form so that they can easily be applied to any type of CSI quantizing solution.

FIG. 2 shows the basic structure of the system proposed in U.S. patent application Ser. No. 11/754,965. The system works as follows:

1. Before the transmission epoch, each receiver 38 estimates 40 its channel matrix H for a feedforward channel 34 and uses this information to perform the singular value decomposition (SVD) 42 of the matrix.
2. The eigenmode and singular value components are separately quantized 44 using two codebooks V 46 and D 48, respectively.
3. The indices of the selected codewords are encoded 52, 54 and fed back 56, 58 to the transmitter 36 on a feedback channel 50.
4. The transmitter includes an indexer and optimizer 66 which uses all decoded 60, 62 indices 64 from all receivers in the system to choose 68, 70 the preselected linear modulation and power allocation matrices B and S, respectively. The choice is based on a predefined set of rules (maximum fairness, throughput etc.).
5. The input signal 72 is modulated using the modulation 74 and power allocation 76 matrices, transmitted to the receiver over the feedforward channel 34, using antennas 32, and the transmitted modulated signal is processed 78 by the receiver.

The feedback channel 50 shown in FIG. 2 will inevitably suffer from the transmission errors and the indices of the channel vectors reported by the receivers will be erroneously decoded at the transmitter. Even if the feedback information is protected by channel codes, in a multiple user scenario, it is possible that the interference will cause the indices to be detected with errors, which will lower the system's throughput.

For example, in FIG. 1, during the first part of the actual vector trajectory 24, the centroid index number 3 represented by bits 011 would be reported to the transmitter. However, if for some reason, the second index bit would be recovered with an error, the centroid index number 1 (represented by bits 001) would instead be received by the transmitter, which would cause it to choose improper modulation matrices B and S (see previous section).

The basic transmission of the feedback indices 23 may comprise the following steps:
1. Selection of the indices 23 representing the centroids 22 closest to the actual channel vectors.
2. (Optional) Adding error detection check bits to the binary representation of the centroid indices.
3. (Optional) Adding channel error correction check bits.
4. Transmission of all the bits.
5. (Conditioned on 3) Performing channel decoding of the received bits.
6. (Conditioned on 2) Performing error detection of the received bits.
7. Reporting the received channel vector indices to the optimizer/indexer in FIG. 2.
8. (Optional) Reporting which indices contain errors to the optimizer/indexer in FIG. 2. This step can use results from 6 or any alternative method as outlined later on.

Based on the above eight steps, the indexer will now be able to make decision on the choice of modulation matrices for the next transmission epoch. Three exemplary approaches to the problem are:
1. If error detection codes or any alternative error detection method is used and the base station optimizer is aware of erroneous receiver indices, it may discard them and only use the correct ones in the optimization phase.
2. If error detection codes or any alternative error detection method is used and the base station optimizer is aware of erroneous receiver indices, it may attempt to recover them and use all received indices (correct and recovered) in the optimization phase.
3. If error detection is not used at all, the optimizer assumes that the received indices are very close to the actual transmitted indices and use them as if they were all correct.

A basic difference between methods 1, 2 and 3 lies in whether the error detection methods are used to detect problems in channel information indices fed back to the base station. If such methods are used, the transmitter may recognize which indices are incorrect and can take appropriate actions. If no error detection may be performed and the received indices are used 'as-is', the vector quantizer indexing must be properly designed as shown in FIG. 3a.

The mapping of the indices to the centroids in a quantizer is a complex task that can influence the system's performance tremendously when errors in the feedback link are not negligible. FIGS. 3a and 3b shows the situation, where the identical vector quantizer has a different mapping of indices 23 and the results of one bit error in the transmission of the centroid indices.

In FIG. 3a, the mapping was done in a way that ensured that one bit error in the last position of the index moved the centroid received at the transmitter not far from the actual one. In other words, the small Hamming distance of the difference between the actual and received indices of the centroid corresponds to the small distance 26 between the actual centroids. The centroid distance 2-6 function will be discussed further in the document.

In FIG. 3b, the small Hamming weight of index error does not correspond to the small centroid distance. In this case, a 1-bit error forces the centroid to move far away from the actual one, which may have a very negative influence on the system's performance.

The following algorithms are presented:
1. Design of the indexing for CSI MIMO vector quantizers.
2. Actual operation of the system using encoded feedback link with CSI MIMO quantizers with or without error detection.

The algorithm for the design of the indexing can be carried out in any suitable computing device, including for example pen and paper. Typically the design will be carried out prior to the initialization of the MIMO system.

The following notation will be used:
$V_k$—the kth centroid in codebook V.
k,l—indices of centroids in codebook V.
$d_{kl}$—the distance between the centroids specified by indices k and l.
d(k;e)—distance profile for centroid $V_k$ and a given number of bit errors e.
GDP(e)—global distance profile for a given number of bit errors e.
i,j—binary indices of a codeword in a vector quantizer.
$H_{ij}$—the Hamming distance between indices i and j.
I—the number of iterations of the index optimization algorithm
N—the length of the binary representation of centroid indices i,j It is assumed that the indexing design follows the design of the channel vector quantizer V using any of the existing methods, for example the method shown in the patent application "Quantization of channel state information in multiple antenna systems" (U.S. patent Ser. No. 11/754,965 pending). The input to the quantizer indexing algorithm is the distance matrix D with number or rows and columns equal to the number of all centroids $V_k$ (with our notation the number of rows and columns is equal to $2^N$). The entries in the matrix are distances between the centroids—for example, the kth row and lth entry is given by $d_{kl}$. In particular, the entries on the diagonal of the matrix are equal to 0. The methods used to calculate the distance matrix D as well as the centroid distances are immaterial in this patent application. However, some of the methods to calculate centroid distances for the matrix D can be defined as follows:
1. $d_{kl}$ is the angle between the centroids $V_k$ and $V_l$.
2. $d_{kl}$ is the smaller of the angles between the centroids $V_k$ and $V_l$ and between the centroids $V_k$ and $-V_l$.
3. $d_{kl}$ is the Euclidean distance between the centroids $V_k$ and $V_l$.
4. $d_{kl}$ is the average system throughput loss when centroid $V_k$ is chosen instead of $V_l$.
5. $d_{kl}$ is the user system throughput loss when centroid $V_k$ is chosen instead of $V_l$.

6. Any other distance definition depending on the system design parameters

In addition to the distance metric $d_{kl}$, representing a distance between two specified quantizer centroids, a set of distance profiles, d(k;e), and a global distance profile, GDP (e), are used to represent the distance profile of the indexed quantizer. A distance profile d(k;e) for a given centroid k and a number of errors e represents a set of numbers corresponding to the distances between all erroneous representations of the centroid V& and the actual centroid $V_k$, assuming that e errors appeared during the transmission of its corresponding index i. In other words, $d(k;e) = \{d_1, d_2, d_3, \ldots, d_n, \ldots, d_E\}$, where E is the number of e-element subsets in N-long binary representation of codebook indices and $d_n$ corresponds to distances $d_{kl}$ between the centroid $V_k$ and its erroneous version VI containing e index errors.

Finally, to characterize the entire codebook, a global distance profile GDP(e) is defined as the union of all distance profiles d(k;e).

Indexing Design Algorithm.

Design of the indexing based on the distance matrix D is performed using a heuristic algorithm operating in two phases: the initialization phase and optimization phase. Since the initialization phase of the algorithm depends on random initial choice of indices, it is recommended that both phases of the algorithm are repeated storing the index map after each optimization step for a given number of iterations/ until the best solution has been found or the design constraint has been met. The general operation of the indexing design algorithm is shown in FIG. 4 and described below.

General Algorithm

1. In step 80, initialize iteration counter i and in step 82 the previous global distance profile GDP previous.
2. In step 84, run the Initialization phase of the algorithm (see below).
3. In step 86, run the Optimization phase of the algorithm (see below).
4. In step 88, store index map and calculate the new global distance profile GDP(e).
5. In step 90 compare GDP(e) with GDP previous; in step 92 check if GDP(e) improves GDP previous and if so then in step 94 exchange GDP previous with GDP(e) and store the current index map.
6. In step 96 increase i by 1.
7. In step 98 if i<I go to 2.
8. In step 100, STOP.

Initialization Phase:

1. In step 102, generate the distance matrix D; in step 104 initialize the lists of unassigned indices, centroids and processed entries in D.
2. In step 106, find the smallest unprocessed entry $d_{kl}$>0 in the matrix D.
3. Mark the entry du as processed.
4. In step 108 search for centroids $V_k$ and $V_l$ corresponding to $d_{kl}$; in step 110 check if any indices have been assigned to either centroid. If neither centroids $V_k$ nor $V_l$ corresponding to du have been assigned any indices i or j, in step 112 (a-c), step 118 (d-e) and step 120 (f):
    a) Choose a random index i from the list of the unused indices.
    b) Assign the index i to the centroid $V_k$.
    c) Mark the ith entry in the list of used indices list as taken.
    d) Choose a random index j from the list of the unused indices in such a way that the corresponding $H_{ij}$ is minimized.
    e) Assign the index j to the centroid $V_l$.
    f) Mark the jth entry in the list of used indices list as taken, and $V_l$ as having an index assigned to it in the list of used centroids.
5. In step 114, check if only one of the centroids $V_k$ or $V_l$ have been assigned an index, and if so in step 118 (a-b) and step 120 (c):
    a) Choose a random index j from the list of the unused indices in such a way that $H_{ij}$ is minimum, where it is assumed (step 116) that i is the binary index of the already indexed centroid.
    b) Assign the index j to the unassigned centroid.
    c) Mark the jth entry in the list of used indices as taken, and mark the unassigned centroid as assigned.
6. If both centroids $V_k$ or $V_l$ have been assigned an index, go to 7.
7. In step 122, if there are still unassigned indices, go to 2.
8. In step 124, STOP.

Figure 5:
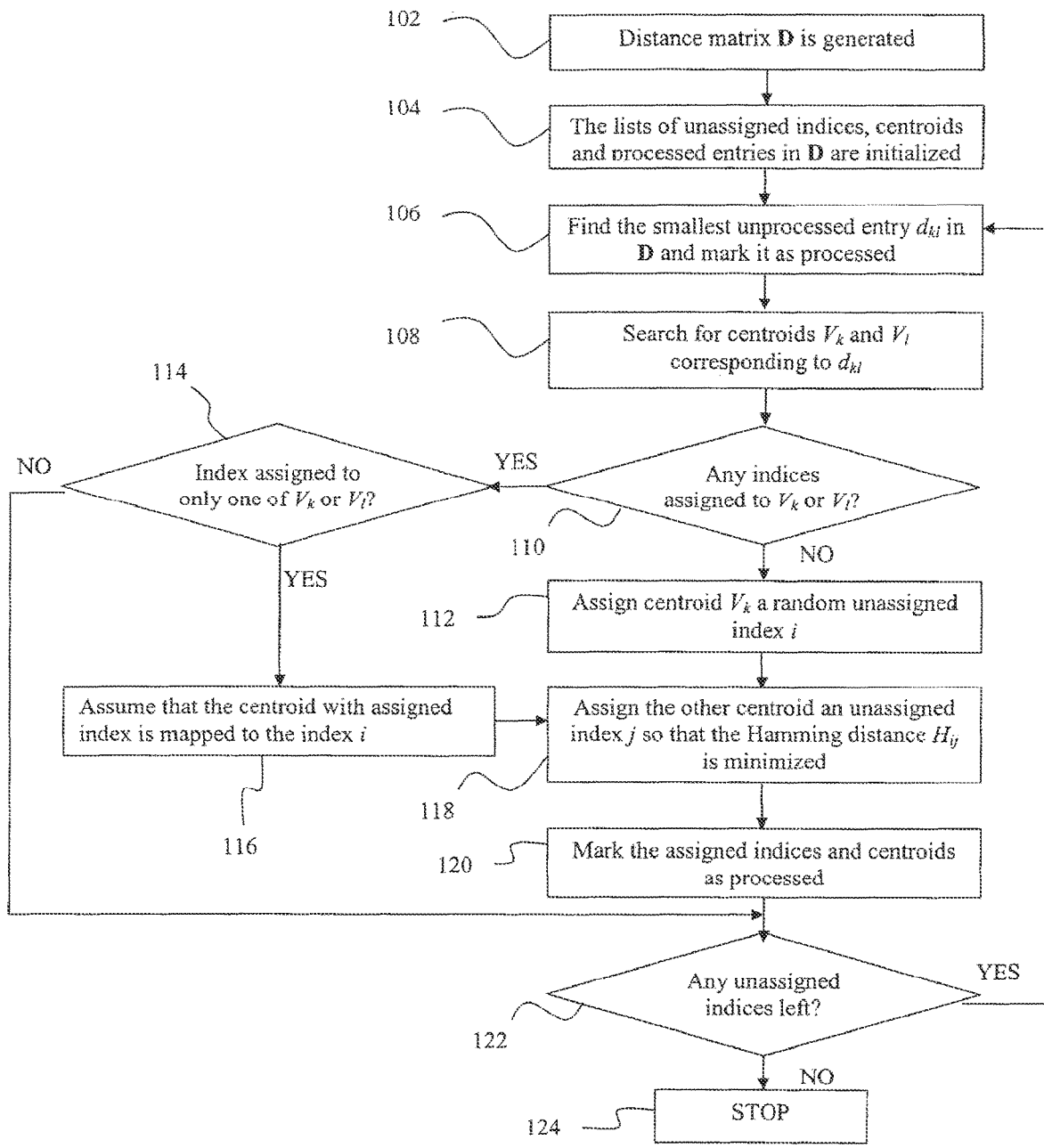
FIG. 5 shows the operation of the initialization phase of the exemplary indexing design algorithm of FIG. 4.

The operation of the initialization phase is presented in FIG. 5.

After the completion of the initialization phase, all centroids $V_k$ in the codebook V have been assigned the binary indices i, with the majority of smallest distances du in matrix D coupled to the binary indices i and j with small Hamming distances. However, the initialization phase can only reach locally optimum solutions and, in the next step, an improved solution is iteratively searched for.

Optimization Phase:

1. In step 130, generate the distance matrix D and initialize the global distance profile GDP(e).
2. In step 132, initialize the list of processed entries in D.
3. In step 134, set the previous global error distance as GDP previous=GDP(e).
4. In step 136, find the smallest unprocessed entry du>0 in the matrix D, and mark it as processed.
5. In step 138, find the binary indices i and j assigned to the centroids k and I. Choose whether to swap them as follows:
    a) In step 140, calculate the global distance profile GDPoriginal(e) with mapping of centroid V& to binary index i and centroid V/to binary index j.
    b) In step 142 and 144, calculate the global distance profile GDP swapped(e) with mapping of centroid $V_k$ to binary index j and centroid V/to binary index i.
    c) In step 146 choose the mapping corresponding to better global distance profile from 6a) and 6b) and in step 148 assign the indices of centroids accordingly.
6. In step 150, check the list of the processed entries $d_{kl}$, and if there are still unprocessed entries, go to 4.
7. In step 152, calculate the GDP(e) with the current mapping of centroids and indices. If it is better than GDP previous then go to 2.
8. In step 154, if there are no improvements over GDP previous STOP.

Figure 6:
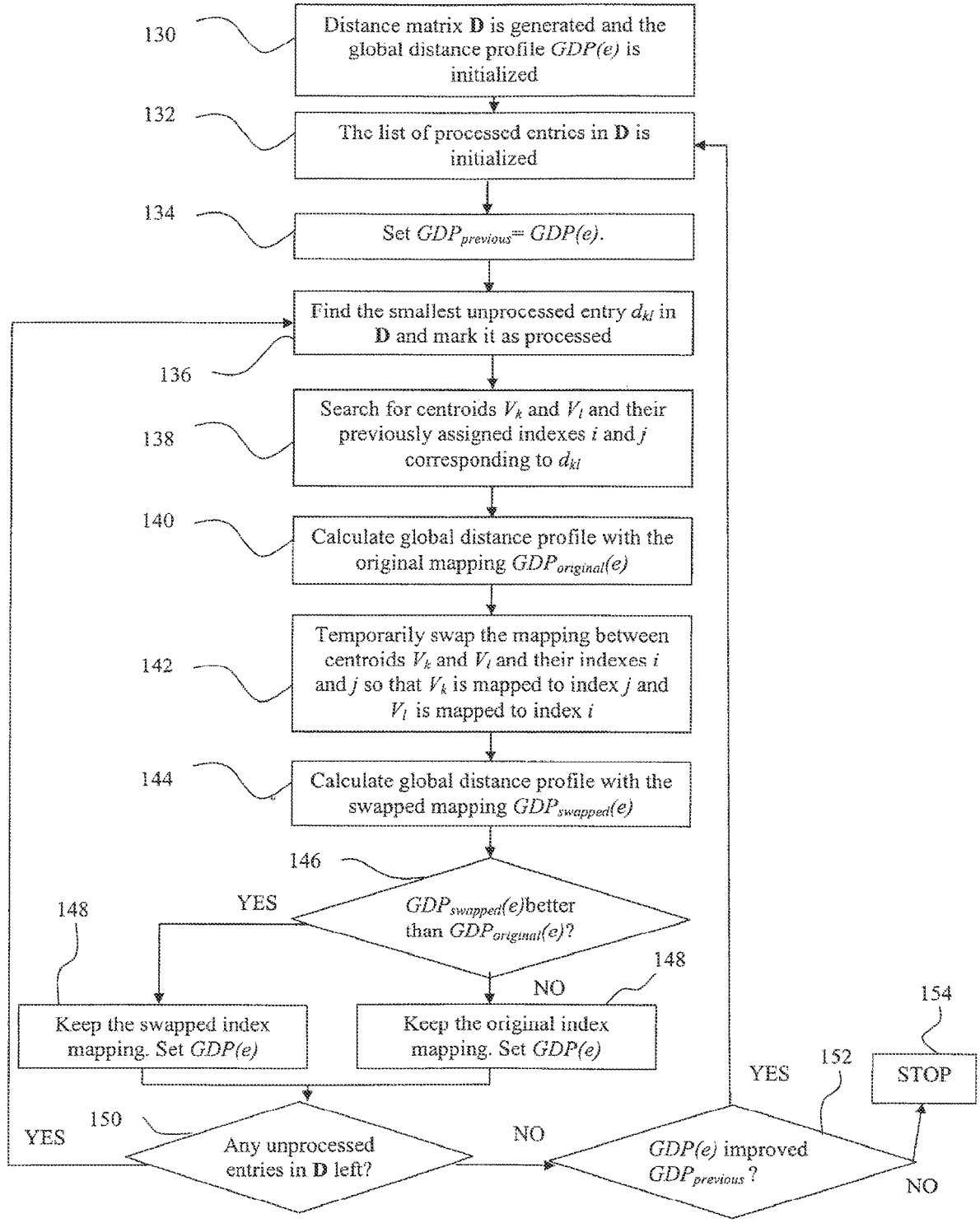
FIG. 6 shows the operation of the optimization phase of the exemplary indexing design algorithm of FIG. 4.

The operation of the optimization algorithm is presented in FIG. 6.

The optimization phase iteratively searches for better mapping between centroids and indices by swapping the binary representation of the closest pairs. After each such swap, the global distance profile for swapped mapping is compared to the unswapped mapping and the globally better solution is chosen. The algorithm is repeated iteratively through all centroids and stops when no improvement can be achieved by consecutive swapping of the indices.

Figure 9:
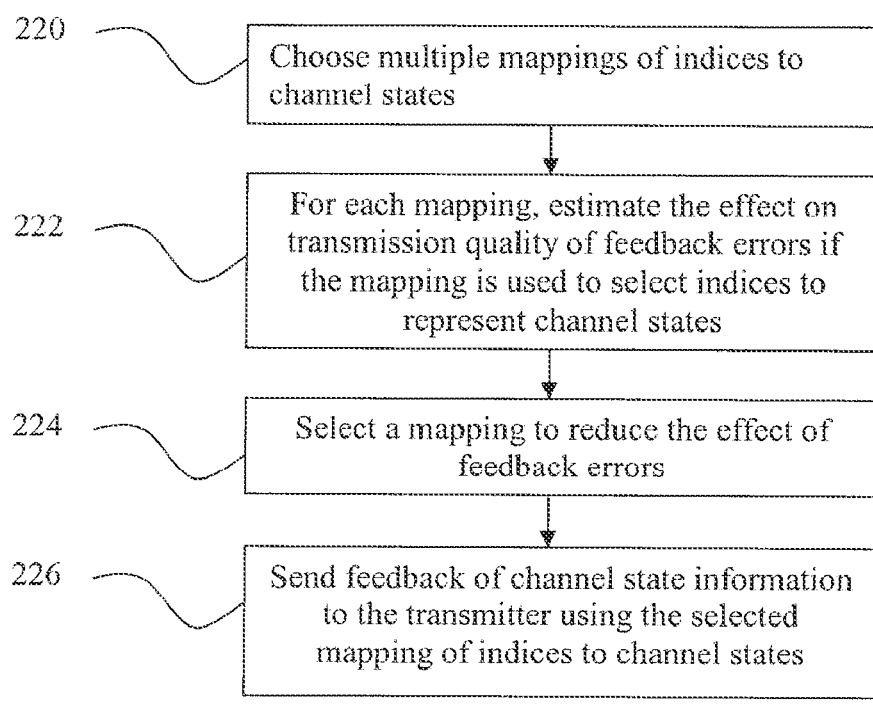
FIG. 9 shows a more general embodiment of an indexing algorithm.

A more general version of this approach to indexing is shown in FIG. 9. In FIG. 5, pairs of centroids (that is, channel states representing a region of channel state space for purposes of quantization) near one another in terms of the chosen distance measure are chosen and are assigned indices also near one another in Hamming distance, Hamming distance being a proxy for the probability of one index being mistakenly received as another (the less the distance, the more likely they will be confused). Since the feedback bandwidth is limited, there will have to be indices near one another in Hamming distance and the effect of feedback errors is reduced if such nearby indices are assigned to nearby channel states, so as to reduce the effect on transmission quality if they are mistaken for one another. Hence the initialization phase depicted in FIG. 5 can be regarded as choosing multiple mappings of indices to channel states in step 220 (the different possible assignments of indices to a pair of channel states), estimating the effect of feedback errors of each in step 222 (using Hamming distance as a proxy in this case), and selecting one in step 224 (in this case one with the minimum Hamming distance) so as to reduce the effect of feedback errors. Similarly the optimization phase shown in FIG. 6 includes choosing multiple mappings of indices to channel states in step 220 (in this case differing from one another by the swapping of pairs of indices), estimating the effect of feedback errors of each mapping (in this case using the global distance profile), and selecting a mapping to reduce the expected effect of feedback errors (by choosing the one with the best global distance profile in this case). No matter how the mapping is selected, it is used in step 226 to send feedback of information concerning a channel state from a receiver to a transmitter, the receiver representing the channel state using the index mapped to the exemplary state (e.g. centroid) for the region of channel state space in which the channel state lies.

System Operation with Error Detection in the Feedback Link

If the system uses error detecting codes in the feedback link, its operation can be summarized as follows:
1. In step 160, initialize transmission epoch to t=1.
2. In step 162, each receiver estimates its channel matrix H[f].
3. In step 164, each receiver performs the vector quantization of the channel state information.
4. In step 166, the channel state information indices are encoded using error detecting code (such as CRC).
5. (Optional) In step 168, the channel state information indices with the error-detection redundancy are encoded using error correcting code (such as convolutional or turbo codes).
6. In step 170, the encoded channel state information indices are fed back to the transmitter.
7. (Conditional on 5) In step 172, the received channel state information indices are decoded in a channel decoder that attempts to correct possible channel transmission errors.
8. In step 174, the decoded indices are checked by an error-detecting decoder.
9. In step 176, the receiver counts the number of erroneously decoded indices.
10. Depending (in step 178) on the implementation, the receiver may then:
    a) In step 180, expurgate the erroneous indices, if there are still enough indices for optimization process, and process only the remaining ones
    b) In step 184, ignore the errors and use the erroneous indices.
    c) In step 182, regenerate the erroneous indices, for example, by using the channel prediction techniques from pending US patent application "Quantized channel state information prediction in multiple antenna systems" Ser. No. 11/852,206.
11. In step 186, the transmitter performs the selection of active users using any method (maximum fairness, maximum throughput etc.) and chooses the corresponding modulation matrices.
12. The signal is transmitted to the selected active receivers.
13. In step 188, increase transmission epoch as t=t+1.
14. Go to 2.

Figure 7:
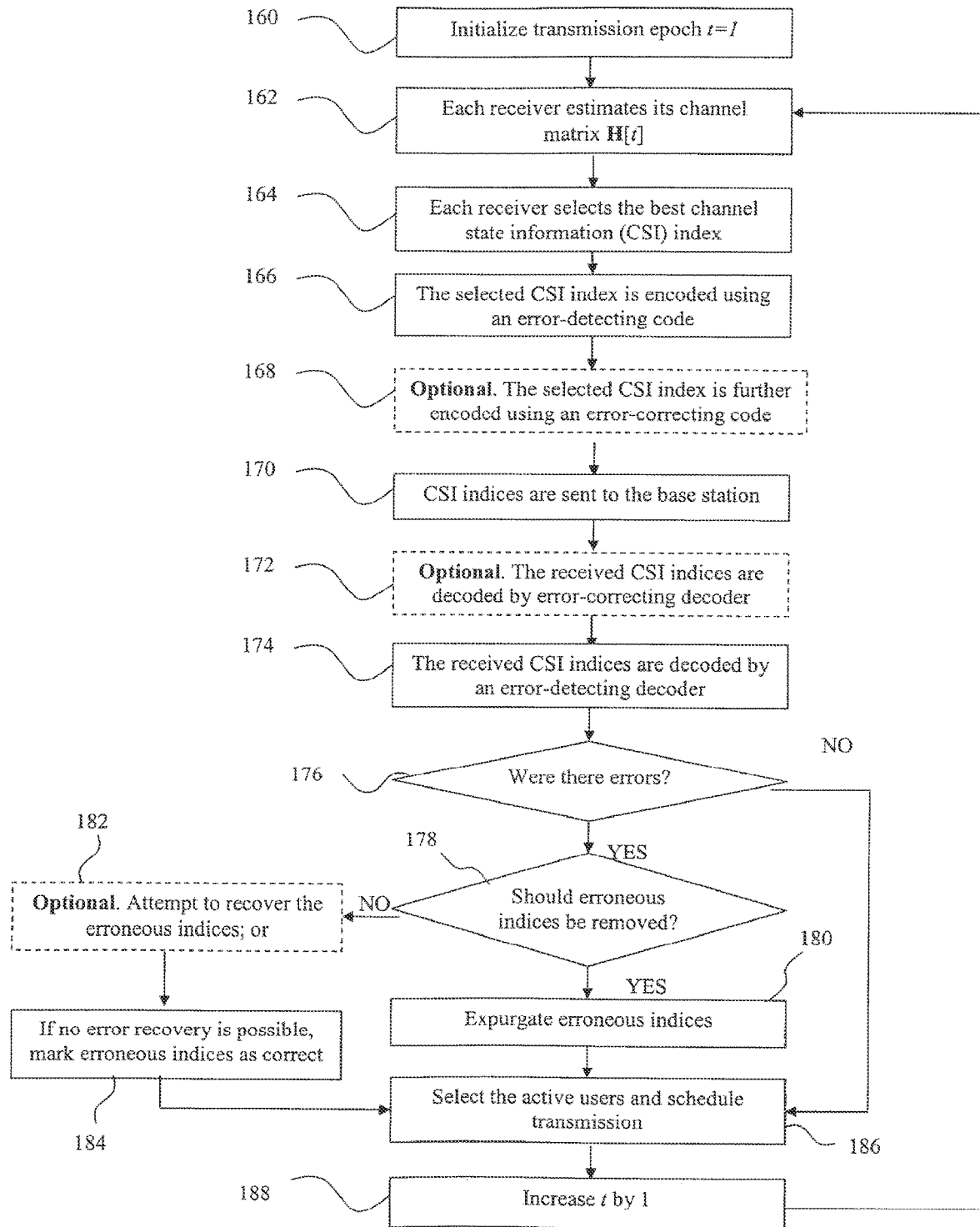
FIG. 7 shows an embodiment of the system operation with error-detecting codes.

The operation of the algorithm is presented in FIG. 7.

System Operation without Error Detection in the Feedback Link

If the system uses no error detecting codes in the feedback link, its operation can be summarized as follows:
1. In step 190, initialize transmission epoch to t=1.
2. In step 192, each receiver estimates its channel matrix H[t].
3. In step 194, each receiver performs the vector quantization of the channel state information.
4. (Optional) In step 196, the channel state information indices with the error-detection redundancy are encoded using error correcting code (such as convolutional or turbo codes).
5. In step 198, the encoded channel state information indices are fed back to the transmitter using the method described in previous sections.
6. (Conditional on 4) In step 200, the received channel state information indices are decoded in a channel decoder that attempts to correct possible channel transmission errors.
7. If (step 202) the index error detection is possible using alternative methods, for example, channel prediction techniques such as the one presented in the pending US patent application "Quantized channel state information prediction in multiple antenna systems" Ser. No. 11/852,206, the transmitter may:
    a. In step 206, expurgate the erroneous indices if there are still enough indices for optimization process,
    b. In step 204, regenerate the erroneous indices using, for example, channel prediction techniques.
8. If (step 202) the index error detection is impossible, in step 208 the receiver uses the received indices as correct ones,
9. In step 210, the transmitter performs the selection of active users using any method (maximum fairness, maximum throughput etc.) and chooses the corresponding modulation matrices.
10. The signal is transmitted to the selected active receivers.
11. In step 212, increase transmission epoch as t=t+1.
12. Go to 2.

Figure 8:
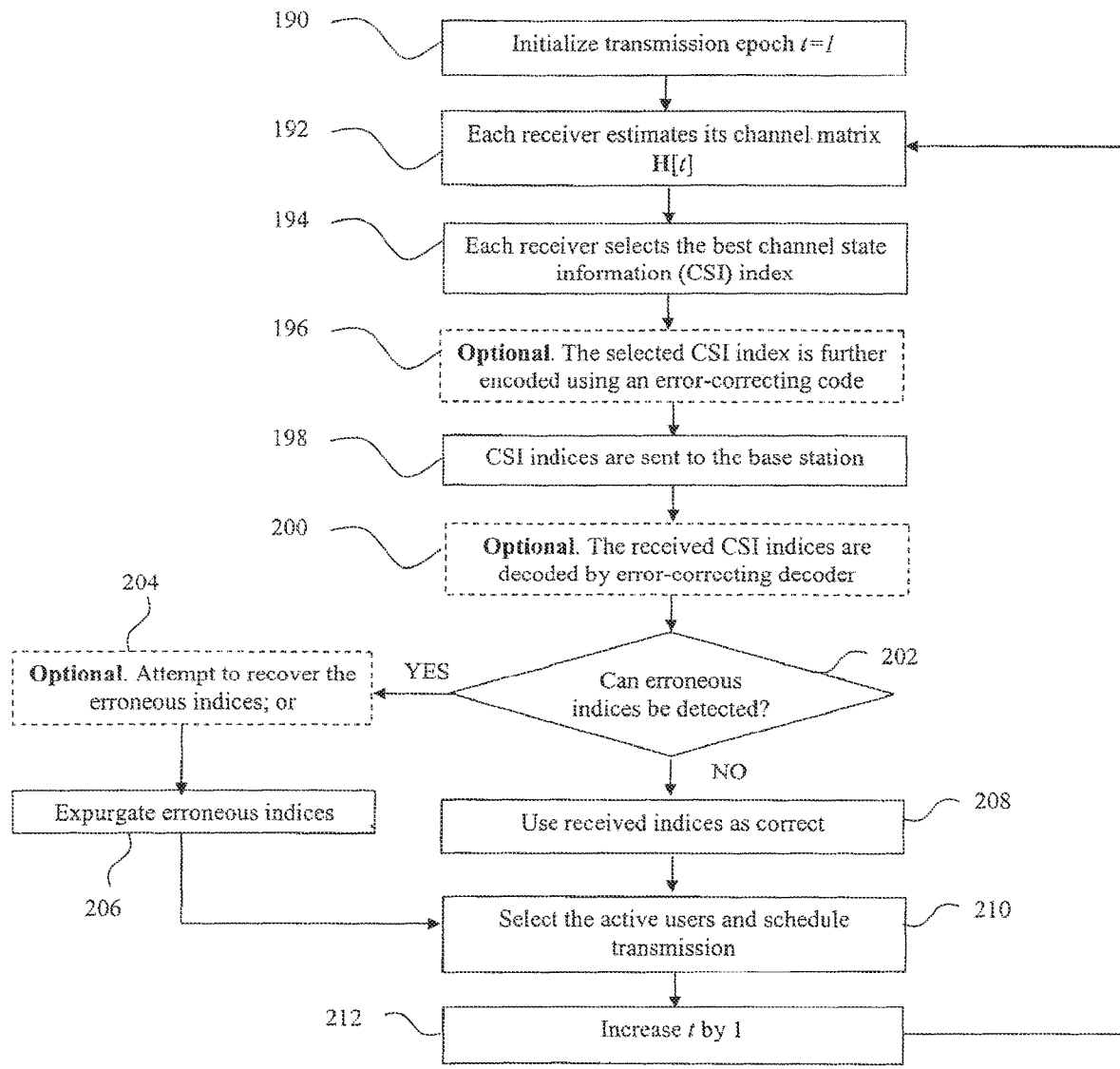
FIG. 8 shows an embodiment of the system operation without error detecting codes.

The operation of the algorithm is presented in FIG. 8.

Immaterial modifications may be made to the embodiments described here without departing from what is covered by the claims. In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

What is claimed:

1. A method implemented in a wireless device, the method comprising:
transmitting an encoded sequence on an uplink feedback channel, the encoded sequence transmitted in a number of symbols that is based on a number of bits available for transmission on the uplink feedback channel; and
receiving a downlink channel based on the encoded sequence.

2. The method of claim 1, wherein the encoded sequence is associated with a codebook which has a Hamming distance that reduces an effect of feedback error.

3. The method of claim 1, wherein the encoded sequence is based on an index that is selected from a plurality of indices based on a channel state of the downlink channel, each of the plurality of indices associated with at least one of a plurality of channel states, wherein the index is selected from the plurality of indices based on an estimated channel matrix for the downlink channel.

4. The method of claim 1, wherein the downlink channel is received by multiple transmit antennas.

5. The method of claim 1, further comprising detecting errors based on channel error detection check bits in the encoded sequence.

6. The method of claim 1, wherein the encoded sequence comprises channel error detection check bits.

7. The method of claim 1, wherein the encoded sequence comprises channel error correction check bits.

8. A wireless device comprising:
transmitter circuitry operable to transmit an encoded sequence based on a number of bits available for transmission on an uplink feedback channel; and
receiver circuitry operable to receive a downlink channel based on the encoded sequence.

9. The wireless device of claim 8, wherein the encoded sequence is associated with a codebook which has a Hamming distance that reduces an effect of feedback error.

10. The wireless device of claim 8, wherein the encoded sequence is based on an index that is selected from a plurality of indices based on a channel state of the downlink channel, each of the plurality of indices associated with at least one of a plurality of channel states, wherein the index is selected from the plurality of indices based on an estimated channel matrix for the downlink channel.

11. The wireless device of claim 8, further comprising multiple receive antennas operable to receive signals on the downlink channel.

12. The wireless device of claim 8, wherein the encoded sequence comprises channel error detection check bits.

13. The wireless device of claim 8, wherein the encoded sequence comprises channel error correction check bits.

14. A method implemented in a wireless device, the method comprising:
transmitting an encoded sequence based on a number of bits available for transmission on an uplink feedback channel; and
receiving a downlink channel based on the encoded sequence.

15. The method of claim 14, wherein the encoded sequence is associated with a codebook which has a Hamming distance that reduces an effect of feedback error.

16. The method of claim 14, wherein the encoded sequence is based on an index that is selected from a plurality of indices based on a channel state of the downlink channel, each of the plurality of indices associated with at least one of a plurality of channel states, wherein the index is selected from the plurality of indices based on an estimated channel matrix for the downlink channel.

17. The method of claim 14, wherein the downlink channel is received by multiple transmit antennas.

18. The method of claim 14, further comprising detecting errors based on channel error detection check bits in the encoded sequence.

19. The method of claim 14, wherein the encoded sequence comprises channel error detection check bits.

20. The method of claim 14, wherein the encoded sequence comprises channel error correction check bits.

* * * * *